Dec. 1, 1964          T. M. CURRY          3,159,027
MULTI-COMPONENT INTERNAL STRAIN GAUGE BALANCE
Filed Nov. 24, 1961          5 Sheets-Sheet 1

INVENTOR.
TRUMAN M. CURRY
BY
Reynolds & Christensen
ATTORNEYS

Dec. 1, 1964 T. M. CURRY 3,159,027
MULTI-COMPONENT INTERNAL STRAIN GAUGE BALANCE
Filed Nov. 24, 1961 5 Sheets-Sheet 2

INVENTOR.
TRUMAN M. CURRY
BY
Reynolds & Christensen
ATTORNEYS

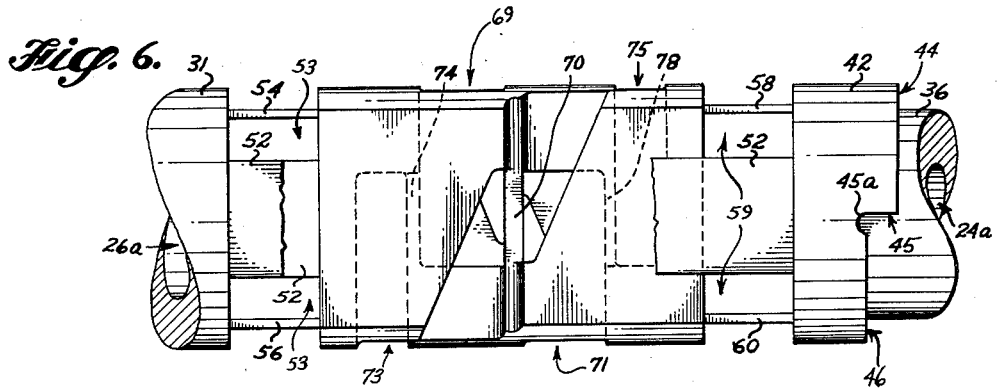
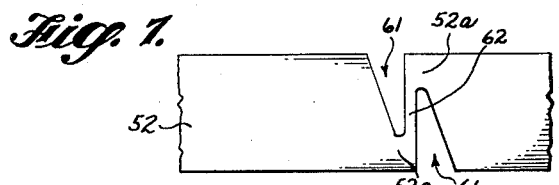
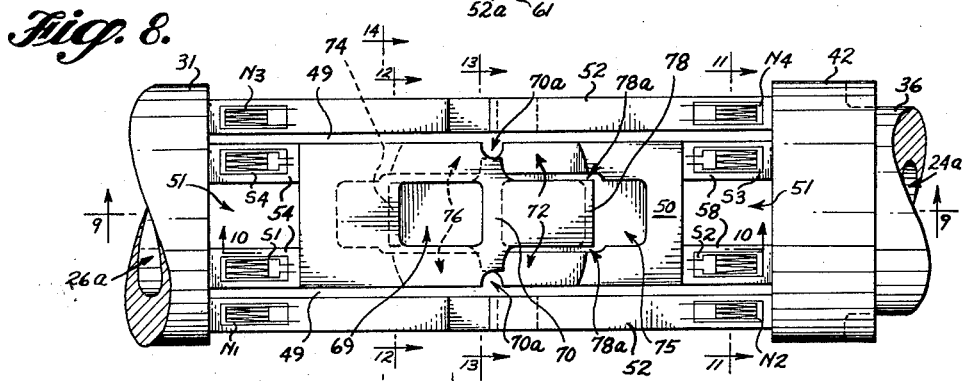
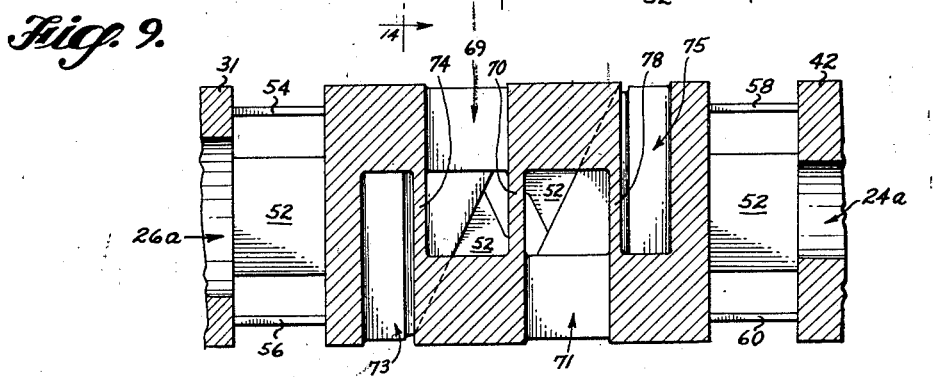
INVENTOR.
TRUMAN M. CURRY

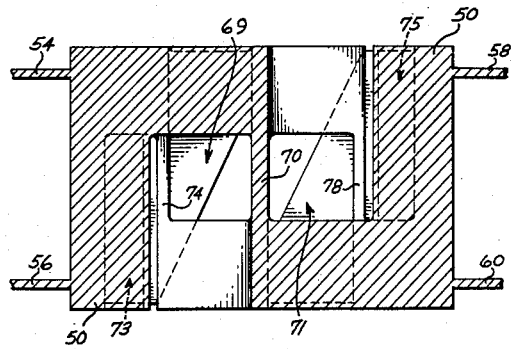
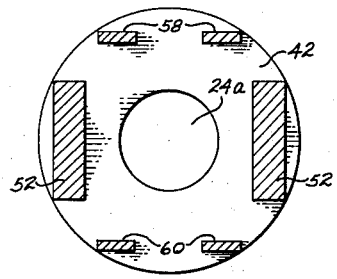
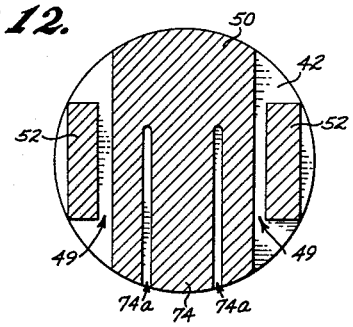
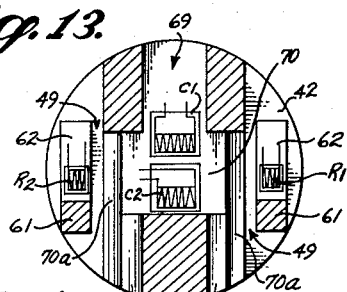
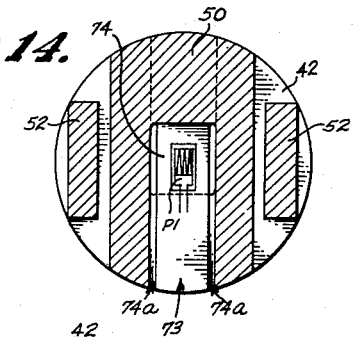
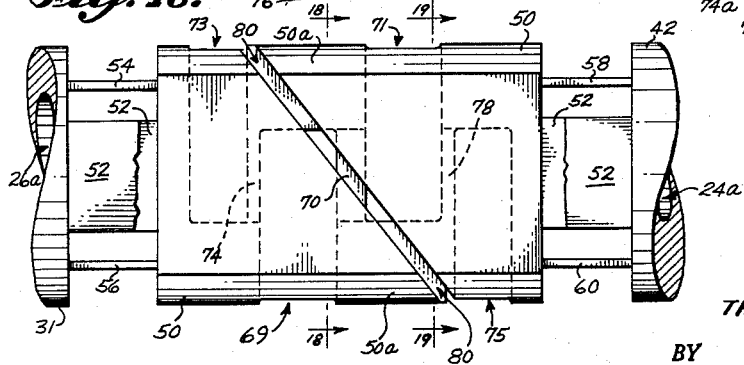

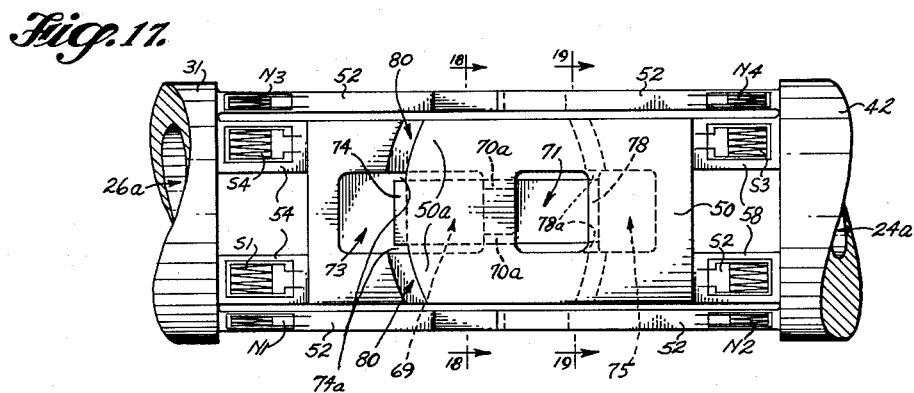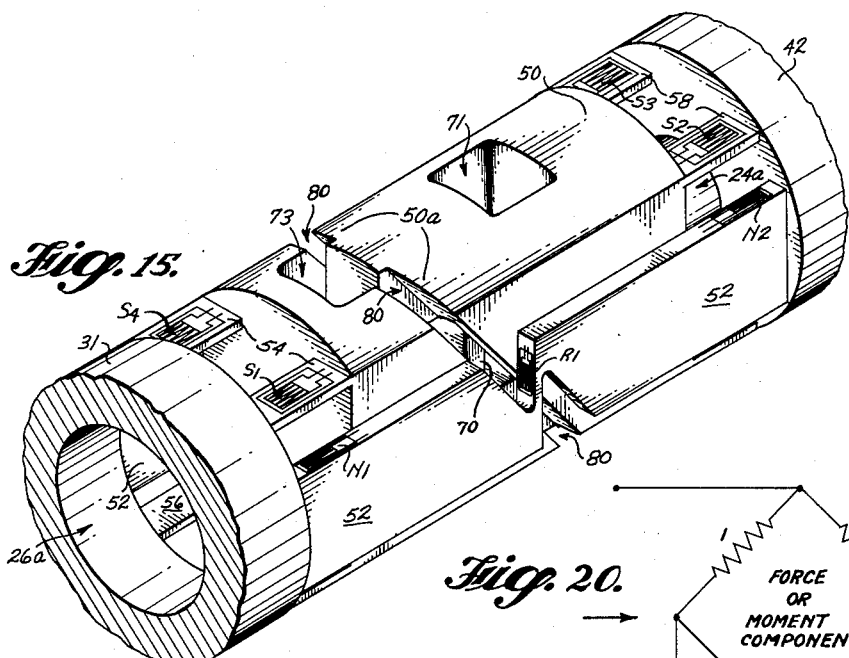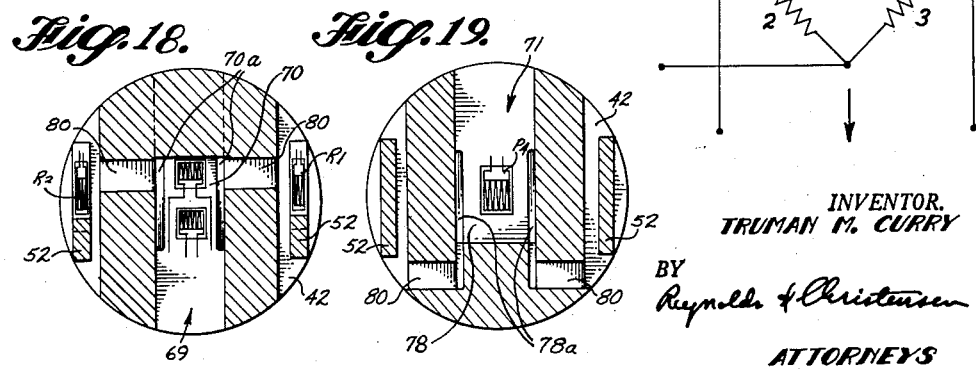

United States Patent Office 3,159,027
Patented Dec. 1, 1964

3,159,027
MULTI-COMPONENT INTERNAL STRAIN
GAUGE BALANCE
Truman M. Curry, Seattle, Wash., assignor to The Boeing Company, Seattle, Wash., a corporation of Delaware
Filed Nov. 24, 1961, Ser. No. 154,706
22 Claims. (Cl. 73—147)

This invention relates generally to force measuring instruments and more particularly concerns a new and improved strain gauge balance for measuring the component forces and moment acting on test models in hypervelocity wind tunnels. The invention is herein illustratively described by reference to presently preferred forms thereof; however, it will be recognized that certain modifications and changes therein with respect to details may be made without departing from the essential features involved. Certain features of the present balance are disclosed and claimed in application Serial No. 789,059, filed January 26, 1959, by this applicant, now U.S. Patent No. 3,019,643.

The requirements imposed upon strain gauge balances designed for use in testing models at hypersonic airspeeds are very stringent. Airspeeds approaching those attainable in actual flight are created in wind tunnels of relatively small cross section. Hence the models and strain gauge balances used must be quite small. The period of time during which the moving air mass in hypervelocity or "Hotshot" wind tunnels achieves such high velocities is very brief, usually lasting only about a tenth of a second or less. The balance must therefore be constructed strong and rigid against excessive deflection or failure under heavy buffeting encountered. The complex interrelated beam structures of the balance must be so designed to permit fashioning the same as an integral one-piece structure, thereby to avoid failure, creep or relative motion in discontinuous fabricated joints between elements due to the shock forces and buffeting involved.

With high instrument resolution, i.e., strain sensitivity, usually go low natural frequency and sluggish responsiveness. However, for supersonic model testing in the brief test intervals mentioned, instant response without resonance in the balance structure is imperative for accurate, readily interpretable force and moment recordings. A balance is therefore required which has high natural frequencies, as well as high sensitivities, in all force planes and about all moment axes of interest.

Further to achieve accurate and readily interpretable recordings of the separate force and moment components acting on the model, the balance must be so designed and constructed to have low values of internal interactive effects between the components being measured. The selected elements in the balance are required structurally to bear and measure each of the different force and moment components of interest effectively isolated from and uninfluenced by those measured by other elements. This requirement has proved highly difficult to achieve in a structure satisfying the other requirements mentioned.

Strain gauge balances designed for use in other than hypervelocity wind tunnels have proved generally unsatisfactory for measuring forces in the short time duration involved in hypervelocity or "Hotshot" wind tunnels. They have failed to achieve the desired results either because of low response rates for the dynamic forces being measured, or because their natural frequencies have not been above the critical values necessary to eliminate confusing oscillations which make analysis of the force and moment recording difficult. For example, balances which are quite compact transversely have been designed by arranging the various measuring elements schematically in series along the longitudinal axes thereof. However, such balances have relatively great flexibility along their length, hence low natural frequencies because of the longitudinal distances over which the forces act, thereby causing undesirable oscillations.

One method of achieving overall compactness of design is to superimpose all the measuring elements into a longitudinally and transversely compact cage. Incident to this type of construction have been difficulties not heretofore satisfactorily solved. For example, the axial force measuring element is characteristically weakest to bending moment due to transverse load. Advantages in strength are therefore gained by locating the axial force measuring element as close as possible to the point along the axis of the balance corresponding to the minimum bending moment. Normally this point occurs at the center of the balance, which is located at the center of gravity of the model. However, it is also desirable, in terms of opportunities for mechanical and human error, to measure moments about the moment center of the balance which is normally located at this same point. Balances heretofore designed in attempting to achieve these objectives, by superimposing around the axial force measuring element the elements for measuring the five transverse components of force and moment, have failed. Either the resulting complex structure has consumed too much space, or the balance has been lacking in accuracy, utility and reliability.

A broad objective of this invention is to provide improved strain gauge balances satisfying the above-mentioned and related requirements and objectives and overcome the described difficulties in prior balances.

A more particular object hereof is to provide balances which are compact for use in testing conditions imposing stringent space requirements.

Another specific object is to provide strain gauge balances having high natural frequencies for accurate measurement of the dynamic force and moment components occurring when models are tested at supersonic airspeeds.

A related specific object hereof is to provide balances having high response rates capable of sensing the dynamic component forces and moments of short time duration incident to testing models at hypersonic speeds.

Another object of this invention is to provide strain gauge balances which, while accomplishing the above and related objectives, achieve more efficient and accurate selective separation of the various force and moment components acting on a model.

A still further object is to provide such a balance which is rugged in construction and capable of relatively simple fabrication from one piece of stock, thereby to be free from defects inherent in jointed or brazed construction.

Briefly, the novel strain gauge balance herein illustrated and described comprises an elongated cantilever preferably formed from one piece of stock and having the usual base section and opposite model-supporting tip section interconnected by an instrument portion extending between the base and tip. The base and tip sections, not constituting a part of the invention, may be of any suitable construction.

The instrument portion embodies the novelty of this invention. It consists generally of three longitudinal parallel measuring beam structures spaced apart transversely in side-by-side relationship and incorporating measuring flexures which carry and measure certain force and moment components acting on the model. More particularly, there is a central beam structure having at opposite ends thereof longitudinally extending flexures which connect it to the end sections and which measure side force and yawing moment. This central beam structure further comprises longitudinally overlapping body portions interconnected by transverse flexures. These flexures include an axial force measuring flexure and two pitching moment measuring flexures spaced longitudinally on opposite sides of the axial force measuring flexure. The axial force measuring flexure is preferably located at the center of gravity of the model, and it is this point at which minimum bending moment occurs and about which all moments are measured.

Two identical side beam structures extend parallel to the central beam structure closely spaced on opposite sides thereof. Their cross sections are substantially smaller than the major cross section of the central beam structure and each has longitudinally overlapping portions interconnected by a transverse measuring flexure for measuring rolling moment. These flexures are preferably located at the longitudinal center of the side beams transversely aligned with the axial force measuring flexure. The side beams themselves constitute flexures for measuring the normal force component acting on the model.

A basic principle involved in the design of this balance is that each measuring flexure or group of measuring flexures is formed and located to have relatively high stiffness and moment of inertia with respect to the component of force or moment which it is intended to measure. Conversely each must have low values of stiffness and moment of inertia with respect to the components which it is not meant to measure, but which it necessarily partially supports. By virtue of the unique parallel arrangement of the beam structures, and therefore, the schematically superimposed arrangement of measuring flexures carried by those beams, this invention provides a compactness of design and sturdiness of construction never before possible in a strain gauge balance. Its configuration enables each measuring element to have a minimum of mass, since it supports substantially only the component which it is designed to measure, and maximum stiffness for the same reason, resulting in a higher natural frequency for the balance as a whole.

The application of these principles as they reside in the particular novel configuration of this balance will become more evident hereinafter. Other features, objects and advantages of the present invention will become more apparent from the following more detailed description taken in connection with the accompanying drawings, illustrating presently preferred embodiments thereof.

FIGURE 6 is a side view of the novel instrument portion with the side beams partially removed to facilitate viewing the central beam.

FIGURE 7 is a side view of the side beam portion cut away in FIGURE 6.

FIGURE 8 is a top view of the instrument portion of the balance.

FIGURE 9 is a longitudinal sectional view of the instrument portion of the balance taken on line 9—9 in FIGURE 8.

FIGURE 10 is a longitudinal sectional view of the instrument portion of the balance taken on line 10—10 in FIGURE 8.

FIGURE 11 is a transverse sectional view taken on line 11—11 in FIGURE 8.

FIGURE 12 is a transverse sectional view taken on line 12—12 in FIGURE 8.

FIGURE 13 is a transverse sectional view taken on line 13—13 in FIGURE 8.

FIGURE 14 is a transverse sectional view taken on line 14—14 in FIGURE 8.

FIGURE 15 is a perspective view of a second preferred embodiment of the novel instrument portion of the balance.

FIGURE 16 is a side view of the second embodiment shown in FIGURE 15, with the near side beam partially cut away to reveal details of the center beam.

FIGURE 17 is a top view of the second embodiment shown in FIGURE 15.

FIGURE 18 is a transverse sectional view taken on line 18—18 of FIGURE 17.

FIGURE 19 is a transverse sectional view taken on line 19—19 of FIGURE 17.

FIGURE 20 is a diagram showing a typical bridge circuit wiring of strain gauges measuring a particular component of force or moment.

Figure 1:
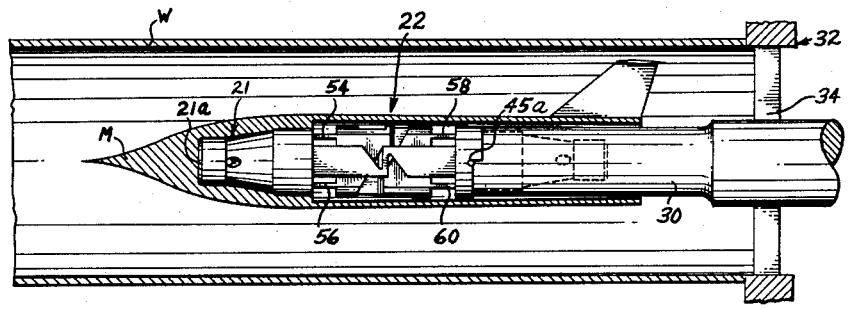
FIGURE 1 is a somewhat diagrammatical longitudinal sectional side view through a wind tunnel test section, showing a model mounted therein on the novel balance.

Referring in more detail to the drawings, in FIGURE 1 the novel strain gauge balance 22 is shown as in use within a model M mounted in a hypervelocity wind tunnel W. The balance 22 is preferably formed from one piece of round stock and generally comprises an elongated rod-like cantilever having a base 24, a model supporting tip 26 and an intermediate instrument portion 25. The cantilever balance 22 is supported within the tunnel by a cantilever rod 30 aligned therewith projecting directly upstream and mounted centrally in the tunnel on a supporting structure at 32 including struts or vanes 34 spaced apart to permit the passage of air.

The cylindrical plug-like tip portion 28 of the model supporting tip 26 fits snugly into the forward-most portion of the model cavity 21, the chamfered forward face 27 thereof abutting against the matching face 21a of the model cavity 21 to prevent longitudinal relative movement between the model and balance. A key (not shown) within the model cavity engages the longitudinal slot 27a in the balance tip to prevent rolling movement of the model on the balance. The tapered shank 29 connects the cylindrical tip 28 with the cylindrical shoulder portion 31, and is provided with the radially slanted holes 29a at the forward end thereof. The holes are engaged by screws (not shown) inserted and tightened from the outside of the model M during mounting to cooperate with the tapered shank 29, which reacts against the corresponding tapered portion of the model cavity 21 to achieve a firm mounting of the model on the balance. The cylindrical shoulder portion 31 of the balance is also engaged tightly by the model socket 21 for further securement whereby all the components of force and moment acting on the model are transmitted to the instrument portion of the balance. The hole 26a extending axially through the tip portion 26 of the balance is provided to accommodate wires or other instrument means connected to the model.

The base section 24 is generally similar to the tip portion 26, having forward and rearward cylindrical portions 36 and 38, respectively, interconnected by a tapered shank 40 which has radially slanted holes 40a directed rearwardly to aid in securement of the balance to the cantilever rod 30 by means of screws (not shown) tightened from the outside of the rod during mounting. The cylindrical portions 36 and 38 fit snugly within a socket or cavity (not shown) formed within the cantilever rod 30, similar to that in the model, thereby to firmly support the balance and model so that all the forces on the model are assumed by the instrument portion of the balance and not lost in a loose joint in the mounting. To enhance this fitting, the balance further is provided with a larger cylindrical portion 42 having two semicircular rearwardly facing surfaces 44 and 46 which are offset from each other longitudinally of the balance to form the torsion keying surfaces or shoulders 45 on opposite sides thereof. The corners formed where the shoulders 45 meet surface 46 are rounded and indented slightly forwardly from the surface 46 to form keying slots 45a. These slots accommodate corresponding keys (not shown) formed at the corners of the matching forward surfaces of the supporting rod 30. The keying surfaces 45 which are angled very slightly in relation to the balance axis cooperate with radially angled set screws (not shown) engaging holes 40a for a positive torsion lock, thus completing a firm mounting of the balance on the cantilever supporting arm 30. The hole 24a passes axially through the base portion and accommodates wires from strain gauges mounted in the instrument portion and other instrument means used in the model and balance.

The tip and base sections of this balance are not considered a part of the invention, as it is well known in the art that these parts of a strain gauge balance must be constructed especially to meet the particular load requirements involved. The base and tip of strain gauge balances designed according to this invention, and the supporting structure built to be used therewith, are all constructed to have high natural frequencies and high strength commensurate with the test conditions to be met. The invention herein resides in the particular novel configuration and arrangement of elements of the instrument portion 25 which is designed especially for the instantaneous measurement of the dynamic force functions incident to hypervelocity wind tunnel testing.

In the manufacture of the balance the various holes and slots cut to form the separate parts of the balance may be milled in any desired order. Thus no significance is given herein to the order in which cuts are described as forming the various beams and flexures. In manufacturing complex balances such as herein described electric spark discharge milling machines are used to advantage.

The novel instrument section 25 comprises a central beam structure 50 and two side beam structures 52 parallel thereto, all extending longitudinally of the balance between the cylindrical shoulder portion 31 of the tip section and the cylindrical shoulder portion 42 of the base section, these cylindrical parts constituting the ends of the instrument section. The three separate beam structures are formed by making narrow cuts 49 vertically through the stock from the forward end portion 31 longitudinally to the rearward portion 42. Further milling vertically and horizontally from the outside of the stock forms the relatively deep and thin rectangular cross sections of the parallel side beam structures 52.

The upper and lower faces of the central beam structure are left rounded to provide greater mass and strength except where milling is necessary to form certain members. Thus at the ends of the central beam structure the upper and lower surfaces are milled to form surfaces of flexures 54, 56, 58 and 60. These flexures, adjoining ends 31 and 42 and supporting the remainder of the central beam structure, are further formed by milling holes 51 and 57 vertically through the stock and holes 53 and 59 transversely through the stock adjacent the respective ends 31 and 42, and by the narrow longitudinal cuts 49 made vertically through the stock on opposite sides of the central beam 50. Thus eight flexures represented by numerals 54, 56, 58 and 60 are formed at the corners of the central beam structure 50 to support the same, each having a rectangular cross section thin in the vertical direction and broad horizontally and relatively short with respect to the overall length of the structure. They are therefore stiff in the longitudinal direction to transmit axial force to the remainder of the central beam structure, and they are spaced vertically as far as possible from the central longitudinal axis of the balance in order to transmit to the remainder of the central beam structure substantially all of the pitching moment component acting on the model M. In addition, top and bottom pairs of supporting flexures at each end of the central beam are formed stiff with respect to horizontal transverse components of force and moment and are spaced apart transversely as far as possible in order to absorb virtually all of the side force and yawing moment acting on the model M. Normal force on the model has very little effect on the central beam since the four pairs of supporting flexures are thin, hence limber in the vertical direction. It will be seen hereinafter that they are relatively limber to rolling moment and relieve the central beam of stress due to that component also.

The parallel side beam structure 52, formed as previously described, are of generally rectangular cross section appreciably smaller than the central beam 50, and have overlapping portions 52a at the center thereof interconnected by transverse (i.e. vertical) flexures 62. These flexures are formed by triangular cuts 61 from the upper and lower surfaces of each side beam 52. These two cuts penetrate about two-thirds of the depth of the side beam and form between them a flexure of rectangular cross section having endwise-facing surfaces and having relatively small thickness of intervening material with respect to the overall length of the instrument portion. Thus flexures 62 are constructed limber to axial force and pitching moment, but are short vertically and therefore are capable of acting as columns in compression and tension to transmit normal force and rolling moment. Flexures 62 assume pitching moment to a negligible degree, since they are located centrally of the balance, i.e. at the pitching moment neutral axis of the model. The side beams themselves have their greater transverse dimension in the normal force direction, and since flexures 62 are stiff in that direction, the side beams assume most of the normal force and the strain along them is substantially proportional thereto. As before mentioned, the central beam 50 assumes very little normal force since the supporting flexures 54, 56, 58 and 60 are limber in the vertical direction.

For the same structural reasons, and for the additional reason that the side beams 52 are located at maximum distance from the rolling moment neutral axis, the side beams carry most of the rolling moment reaction, leaving little to be transmitted to the central beam structure. Finally, since the side beams 52 have their lesser transverse dimension in the direction of side force and in the yawing moment plane, they relinquish virtually all of the side force and yawing moment to the central beam to be carried by the supporting flexures 54, 56, 58 and 60 and measured by appropriately-wired strain gauges mounted thereon.

Referring in more detail to the central beam structure 50, the central section thereof supported by flexures 54, 56, 58 and 60 is larger in transverse cross section than the side beams 52 and has longitudinally overlapping body portions interconnected by three vertically oriented measuring flexures spaced apart longitudinally of the balance. The middle one of the three is an axial force measuring flexure 70 located coincident with the pitching moment and yawing moment neutral axis of the balance. The remaining two flexures comprise pitching moment measuring flexures 74 and 78. The axial force measuring flexure 70 is formed by milling the generally square holes 69 and 71 from the upper and lower surfaces, respectively, of the stock. These holes are milled to equal depths approximately two-thirds the thickness of the stock and are spaced apart longitudinally to form flexure 70 of the desired thickness. This flexure is further formed by making the generally triangular cuts 72 from the upper surface and 76 from the lower surface of the stock, which cuts also extend about two-thirds the distance through the stock and overlap to form opposite surfaces of the vertically extending flexure 70. The stiffness of this flexure is determined by the thickness remaining between the milled holes 69 and 71 and by its breadth transversely of the beam. Further milling may be performed along the vertical outside edges 70a thereof in the narrow slots 49 to establish the stiffness thereof at a desired value.

The forward pitching moment measuring flexure 74 is formed by hole 69 before mentioned and a similar generally rectangular hole 73 milled from the lower surface to a depth of two-thirds the beam thickness and spaced apart from hole 69 to determine the thickness of the flexure 74. The other pitching moment measuring flexure 78 is similarly formed by hole 75 milled from the upper surface and by the previously mentioned hole 71 milled from the bottom. Relatively narrow slots 74a and 78a separate the side edges of these flexures, respectively, from the main stock, these slots connecting holes 73 and 75 with holes 69 and 71 and triangular cut-outs 76 and 72, respectively.

As previously mentioned, substantially the only components of force and moment passing to this section of the central beam are axial force and pitching moment. The measuring element 70 assumes most of the axial force component because it is formed thicker and broader than the pitching moment flexures 74 and 78. These latter flexures are relatively limber to the double cantilever bending caused therein by the axial force component tending to longitudinally displace the overlapping body portions of the center beam relative to each other. The axial force measuring flexure 70 has a substantially greater cross section than the rolling moment flexures 62 of the side beams which are aligned therewith. On the other hand, since this flexure 70 is located at the pitching moment neutral axis, very little of that component is absorbed thereby. It acts as a fulcrum for the constant bending moment along the central beam caused by pitching moment, which results in compression and tension alternatively in the pitching moment flexures 74 and 78. Since these flexures are stiff in the vertical direction, they assume substantially all of the pitching moment component. Because of the broadness and relatively great mass of the central portion of the center beam 50, substantially none of the yawing moment and side force components acting on the model are sensed by the three vertical central beam flexures. These components are carried almost entirely by the central beam supporting flexures 54, 56, 58 and 60.

Figure 3:
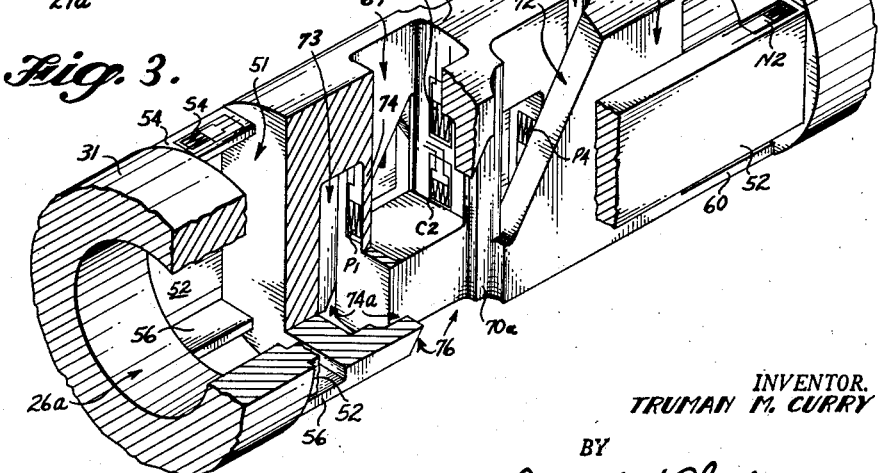
FIGURE 3 is a similar isometric view on a larger scale of the novel instrument portion of the balance with portions thereof cut away to reveal internal details of construction and strain gauge locations.

Another embodiment of the novel instrument section is shown in FIGURES 15 through 19, this form differing in configuration from that just described primarily only in the structure of the central portion of the center beam structure 50. That is, instead of making the triangular cuts at laterally opposite sides of the central beam from upper and lower surfaces thereof as at 72 and 76, respectively, in FIGURE 3, a relatively narrow continuous slot 80 is made diagonally in and along the two vertical outside faces of the central beam from the upper surface to the lower. This slot 80 laterally connects the openings 49 between the central beam and side beam structures with the longitudinal vertical slots 74a and 78a forming the side edges of the pitching moment beams 74 and 78, respectively. Additional slots 70a longitudinally of the balance at the edge of flexure 70 are necessary in this case to separate it from the rest of the center beam stock.

By means of electric spark discharge milling machines, these slots are milled or eroded longitudinally through the stock from hole 69 to 71, or vice versa. Slots 74a and 78a are formed by the same process to connect hole 73 with hole 69 and diagonal slots 80, and to connect hole 75 with hole 71 and diagonal slots 80 on laterally opposite sides internally of the center beam, thereby forming the edges of the pitching moment flexures 74 and 78 as before mentioned.

The relative locations of the measuring elements in this configuration of the invention are substantially the same as that previously described, their relative sizes being determined as usual by the particular test requirements involved. The essential difference between the two embodiments is the additional mass retained in the central beam in the latter embodiment by avoiding making the large triangular or V-shaped cuts used in the first embodiment. The result is greater strength and stiffness in the center beam, and consequently higher natural frequencies obtained for the balance as a whole. That is, it will be observed that a great deal more supporting structure remains at 50a in this configuration for the pitching moment measuring flexures 74 and 78, as well as surrounding the axial force measuring flexure 70. Additional strength and stability, and therefore higher response frequencies, are obtained in the central beam, if desired, by designing it thicker with respect to the side beams, as is illustrated by the greater cross section thereof relative to the side beams in this embodiment than in that first described.

Figure 4:
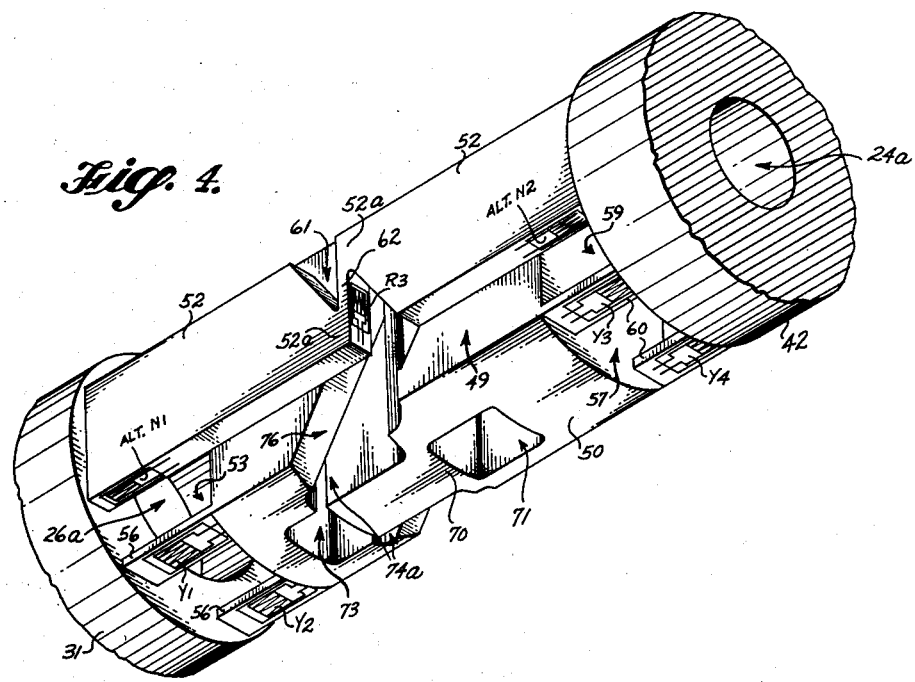
FIGURE 4 is a bottom isometric view of the novel instrument portion.
Figure 5:
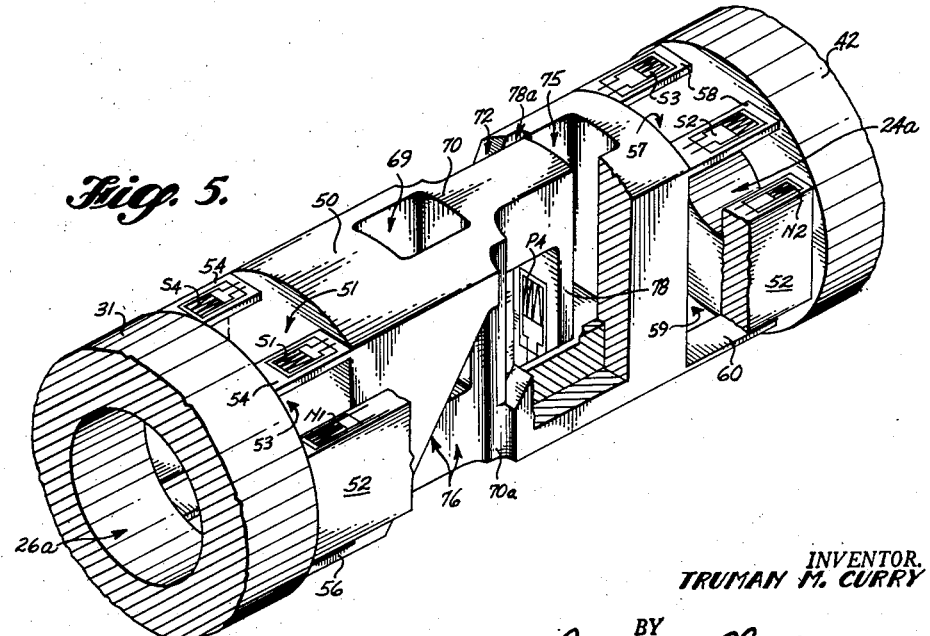
FIGURE 5 is another top isometric view of the instrument portion with different portions removed to disclose other details of construction.

The mode of strain gauge measurement of the stresses in a strain gauge balance is well known in the art. For measuring pitching moment strain gauges $P_1$ and $P_3$ (not shown) are mounted opposite each other on the endwise facing surfaces of flexure 74, and $P_2$ (not shown) and $P_4$ are mounted on opposite endwise-facing surfaces of flexure 78. For measuring axial or chord force strain gauges $C_1$ and $C_2$ are mounted on the forward facing surfaces of the axial force flexure 70 and gauges $C_3$ and $C_4$ (not shown) are mounted on the rearward face thereof, these gauges being located to sense the stress due to the double cantilever bending in this member caused by axial force displacement of the overlapping body portions of the central beam 50. Side force gauges $S_1$, $S_2$, $S_3$ and $S_4$ are mounted, as shown most clearly in FIGURES 2, 3, 5 and 8, on the upper surfaces of the upper central beam supporting flexures 54 and 58. Yawing moment gauges $Y_1$, $Y_2$, $Y_3$, and $Y_4$ are mounted as shown in FIGURE 4 on the lower surfaces of the lower central beam supporting flexures 56 and 60. Normal force flexures $N_1$ through $N_4$ are mounted on the upper faces of the side beams adjacent the ends 31 and 42 of the instrument portion. Additional sensitivity to certain force and moment components may be obtained by mounting additional strain gauges on surfaces of the respective flexures opposite those surfaces upon which gauges are shown mounted and by wiring the resulting pairs in series as part of the usual bridge circuit for each component. For example, additional (or alternative) normal force gauge positions Alt. $N_1$ and Alt. $N_2$ are shown on the lower surface of the side beam 52 in FIGURE 4. For each force or moment component the numbered gauges are wired in a bridge circuit in the usual manner, as shown in FIGURE 20. The components of force and moment which are sensed by the respective sets of strain gauges but are not to be measured by them are withheld from measurement by this system of wiring according to the usual manner of wiring a strain gauge balance. For example, the side force and yawing moment gauges mounted on the central beam supporting flexures would measure stress due to axial or drag force, but as wired in FIGURE 20 the measurements due to that component would be cancelled out, since the bridge is not unbalanced when all the resistances thereof are increased or decreased simultaneously by the same value. This principle is well known in the art and requires no further discussion herein.

As previously pointed out, each flexure or set of flexures in this novel balance is designed to have maximum stiffness to the component it is to measure and minimum stiffness to the components not to be measured thereby. Each is located at a maximum distance from the neutral axis of the moment component it is to measure, and minimum distance from the neutral axis of moments not to be measured thereby. Thus each has an optimum moment of inertia for its specific assignment and, consequently, maximum sensitivity to the component it is to measure and minimum sensitivity to those it is not to measure. The result is a balance having various elements designed with thinner individual cross sections since each must carry substantially only the component it is to measure, and yet each has greater stiffness and strength with respect to that component. Since natural response frequency is an inverse function of mass but is proportional to stiffness, the response frequency of each element is very high in this configuration. At the same time interactions in each element are reduced to a minimum. It will be recognized that two major objects of this invention are accomplished thereby: to provide a balance of very high natural frequency, and to provide a balance having a bare minimum of interactions between force and moment components, thereby to achieve greater sensitivity and accuracy of measurement at supersonic speeds. It has been found that both of the illustrated embodiments and variations thereon accomplish these purposes.

Figure 2:
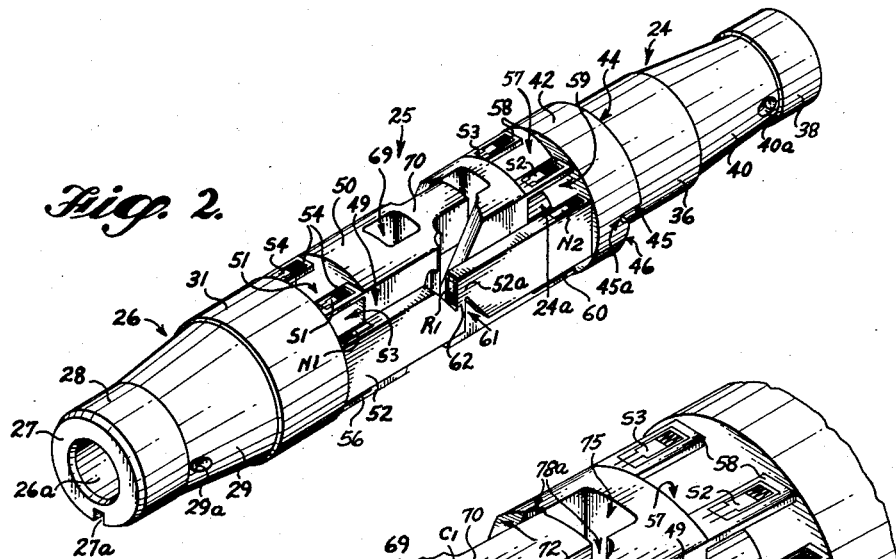
FIGURE 2 is a top isometric view of the novel strain gauge balance as mounted in the position shown in FIGURE 1.

The two balance configurations herein described have been illustrated in a position disposed horizontally in a wind tunnel having their transverse flexures disposed vertically as shown, for example, in FIGURE 2. The transverse flexures of the central beam structure measure axial force and pitching moment when the balance is mounted in this position, and the supporting end flexures thereof measure yawing moment and side force. It will be recognized by those skilled in the art, however, that the balance may also be mounted rotated ninety degrees from this position and used to advantage. In this alternative position the transverse flexures of the central beam structure would measure axial force and yawing moment, and the longitudinal supporting flexures would measure normal force and pitching moment, while the side beam structures would measure side force and rolling moment.

In addition, the relative sizes and positions of the various elements may be changed within the scope of the appended claims to meet the necessities of different testing conditions and positions used, without departing from the spirit of this invention. For example, if normal force and rolling moment measurements are not crucial, a balance could be designed according to this invention comprising principally only the central beam structure herein described. In such a case additional strength could be achieved at the ends of the instrument portion to replace that lost by eliminating the side beam structures by providing more or larger longitudinal parallel supporting end flexures.

Many other variations within the scope of this invention are possible. Other uses and possible modifications in detail within the scope of this invention will be recognized by those skilled in the art.

I claim as my invention:

1. A strain gauge balance for aerodynamic model testing comprising an elongated cantilever having a base, an opposite model-supporting tip, and an intermediate instrument portion, said instrument portion including two longitudinally extending side beam structures disposed in transversely spaced, substantially parallel relationship interconnecting said base and tip, and a central beam structure also interconnecting said base and tip and disposed intermediate said side beam structures, each of said beam structures comprising opposite end portions and at least one transversely extending measuring flexure interconnecting said end portions, and strain gauge means mounted on selected flexure surfaces of said beam structures and electrically connected to measure components of force and moment acting on said balance.

2. The strain gauge balance defined in claim 1 wherein said central beam structure includes a transversely extending axial force measuring flexure located substantially at the geometrical center of said balance and other transverse measuring flexures disposed in substantially parallel relationship therewith, longitudinally spaced from said axial force measuring flexure and having longitudinally-facing flexure surfaces for measuring components of moment transverse thereto.

3. The strain gauge balance defined in claim 2 wherein the side beam structures are substantially identical, each including body portions longitudinally overlapping substantially at the longitudinal center thereof and a transverse flexure interconnecting said overlapping body portions and having longitudinally-facing measuring surfaces thereon.

4. The strain gauge balance defined in claim 1 wherein said side beam structures comprise beams of substantially rectangular cross section, each having a lesser transverse dimension in the direction of the transverse spacing of said beams from each other and a greater transverse dimension substantially in a direction perpendicular thereto, said beams further having transversely facing measuring surfaces upon selected ones of which said strain gauge means are mounted.

5. The strain gauge balance defined in claim 4 wherein said side beam structures include longitudinally overlapping body portions interconnected by said transverse flexures, said flexures having longitudinally-facing measuring surfaces upon selected ones of which said strain gauge means are mounted.

6. The strain gauge balance defined in claim 1 wherein the opposite end portions of said central beam structure include longitudinally disposed, substantially parallel supporting flexures having transversely facing measuring surfaces upon selected ones of which at least some of said strain gauge means are mounted.

7. The strain gauge balance defined in claim 6 wherein said supporting flexures of said central beam structure include measuring flexures of substantially rectangular cross section having transversely facing measuring surfaces disposed in substantially parallel planes, upon selected ones of which said strain gauge means are mounted and electrically connected to measure components of force and moment transverse to said balance in a plane parallel to such surfaces.

8. The strain gauge balance defined in claim 6 wherein said supporting flexures of said central beam structure are constructed short relative to the overall length of the instrument portion and thereby axially stiff to transmit axial force along said central beam structure, and wherein said central beam structure includes transversely extending axial force measuring flexure means.

9. The strain gauge balance defined in claim 6 wherein said supporting flexures of said central beam are constructed short relative to the overall length of the balance and thereby axially stiff, and are located transversely spaced apart at the periphery of the central beam structure thereby to transmit along said central beam structure the moment component acting on said balance in a longitudinal plane parallel to the direction of the spacing apart of said flexures, said central beam structure including transversely extending measuring flexures disposed in substantially parallel relationship spaced from each other longitudinally of the balance and having longitudinally-facing flexure surfaces upon selected ones of which said strain gauge means are mounted for measuring said moment component.

10. The strain gauge balance defined in claim 9 wherein said central beam structure includes at least one additional transverse measuring flexure for measuring axial force.

11. The strain gauge balance defined in claim 10 wherein the side beam structures include transversely facing surfaces thereof for measuring components of force and moment acting transverse to the balance, and overlapping body portions interconnected by said transverse flexures of said side beams, such flexures having longitudinally-facing measuring surfaces.

12. The strain gauge balance defined in claim 1 wherein the transversely extending measuring flexures of said beam structures extend in substantially parallel relationship mutually and have longitudinally-facing measuring surfaces upon selected ones of which said strain gauge means are mounted.

13. A strain gauge balance for aerodynamic model testing comprising an elongated normally horizontally-mounted cantilever having a base, an opposite model-supporting tip, and an intermediate instrument portion, said instrument portion including a longitudinally extending central beam structure having supporting end portions and an intermediate body section, said body section having longitudinally overlapping body portions interconnected by vertically extending web-like measuring flexures, said instrument portion further including longitudinally extending side beam structures in spaced parallel relation adjacent the opposite sides of said central beam structure, each such side beam having overlapping body portions interconnected by at least one vertically-extending measuring flexure, and strain gauge means mounted on selected surfaces of at least certain of said measuring flexures and electrically interconnected to measure components of force and moment acting on said balance.

14. The strain gauge balance defined in claim 13 wherein the supporting end portions of the central beam structure comprise longitudinally-disposed central beam supporting flexures connecting said intermediate body section to said base and tip, said supporting flexures lying in generally parallel spaced relation to each other and being constructed short relative to the overall length of the instrument portion whereby to have axial stiffness to transmit axial force acting on the balance to said intermediate body section, said intermediate body section including at least one axial force measuring flexure.

15. The strain gauge balance defined in claim 14 wherein said central beam supporting flexures include pairs thereof vertically spaced apart to have maximum moments of inertia with respect to pitching moment acting on the balance, thereby to transmit the pitching moment component to said intermediate body section, said intermediate body section including at least one pair of pitching moment measuring flexures spaced from each other longitudinally of the balance.

16. The strain gauge balance defined in claim 15 wherein said intermediate body section includes such an axial force measuring flexure located centrally of the balance and having endwise facing measuring surfaces, and two such pitching moment measuring flexures constructed substantially thinner longitudinally of the balance than said axial force measuring flexure thereby to be substantially more limber than the same with respect to axial force acting on the balance, said pitching moment measuring flexures being further constructed short relative to the vertical depth of the balance to be stiff vertically thereof, and spaced from opposite sides of the axial force measuring flexure longitudinally of the balance thereby to have substantially larger moments of inertia than the same with respect to pitching moment acting on the balance.

17. The strain gauge balance defined in claim 16 wherein said central beam supporting flexures include pairs thereof horizontally spaced apart transversely of the balance to have maximum moments of inertia with respect to the yawing moment component acting on the balance, said flexures each having a greater transverse dimension in said horizontal direction than vertically of the balance thereby to have stiffness with respect to the side force component acting on the balance, and each having vertically facing surfaces upon selected ones of which strain gauges are mounted for measuring said components.

18. The strain gauge balance defined in claim 17 wherein the side beam structures are constructed having substantially greater transverse thickness vertically of the balance than said central beam supporting flexures thereby to have collectively greater stiffness to the normal force component acting on the balance than said central beam supporting flexures, said side beam structures having vertically facing measuring surfaces upon selected ones of which strain gauges are mounted for measuring said component.

19. The strain gauge balance defined in claim 18 wherein the side beam structures are constructed having collectively a substantially greater transverse cross section than the collective cross section of said central beam supporting flexures and located at maximum spacing from each other transversely of the balance, thereby to have a substantially greater collective moment of inertia than the collective moment of inertia of said central beam supporting flexures with respect to the component of rolling moment acting on the balance, each of said side beam structures having at least one vertically-extending rolling moment measuring flexure interconnecting overlapping body portions thereof.

20. A strain gauge balance for aerodynamic model testing comprising an elongated cantilever having a base, an opposite model-supporting tip and an intermediate instrument section, said instrument section comprising a beam structure including, intermediate its ends, transversely separated longitudinally extending body portions interconnected by a relatively stiff, transversely disposed axial force measuring flexure and by relatively limber transversely extending moment measuring flexures spaced longitudinally of the balance from opposite sides of said axial force measuring flexure, said beam structure further comprising pairs of parallel, longitudinally disposed moment transmitting flexures at each end thereof connecting the longitudinally extending body portions to the base and tips, respectively, at least one such pair at each end being spaced apart transversely of the cantilever in the direction of extent of said moment measuring flexures, whereby to transmit moments thereto.

21. The strain gauge balance defined in claim 20 wherein said longitudinal moment transmitting flexures further include at least one pair thereof at each end of the beam structure spaced apart transversely to the direction of spacing of the first-mentioned pair for measuring forces and moments in a longitudinal plane parallel to their spacing.

22. A strain gauge balance for aerodynamic wind tunnel model testing comprising an elongated cantilever of normally horizontal position having a supporting base portion, an opposite model-supporting tip extending from said base generally upstream of wind flow in a wind tunnel, an interconnecting intermediate instrument portion, said instrument portion including a transversely central longitudinal beam structure having overlapping body portions interconnected by transverse parallel measuring flexures for segregating and measuring axial force and pitching moment components acting on the balance, respectively, said central beam structure also including parallel longitudinally disposed supporting end flexures spaced transversely adjacent the periphery of the central beam structure and having upper and lower measuring surfaces whereby to segregate and measure side force and yawing moment components acting on the balance, said instrument portion further including two substantially identical side beam structures extending longitudinally of the balance in spaced parallel relation adjacent said central beam structure and located substantially symmetrically on opposite sides thereof, said side beam structures having transversely facing surfaces for segregating and measuring normal force and a centrally located transverse measuring flexure with endwise facing surfaces for segregating and measuring rolling moment acting on the balance, and strain gauge means mounted on the flexures of said balance and electrically connected for measuring such components of force and moment.

References Cited by the Examiner

UNITED STATES PATENTS

| | | | |
|---|---|---|---|
| 2,767,577 | 10/56 | Gilbert | 73—147 |
| 2,865,200 | 12/58 | Gieseler | 73—147 |
| 3,019,643 | 2/62 | Curry | 73—147 |
| 3,043,136 | 7/62 | Cunningham et al. | |

RICHARD C. QUEISSER, *Primary Examiner.*

DAVID SCHONBERG, *Examiner.*